Dec. 15, 1931. J. J. M. GUEUX 1,837,041
MECHANISM FOR THE AUTOMATIC CONTROL OF LIQUID DISTRIBUTORS
Filed May 31, 1929 3 Sheets-Sheet 3

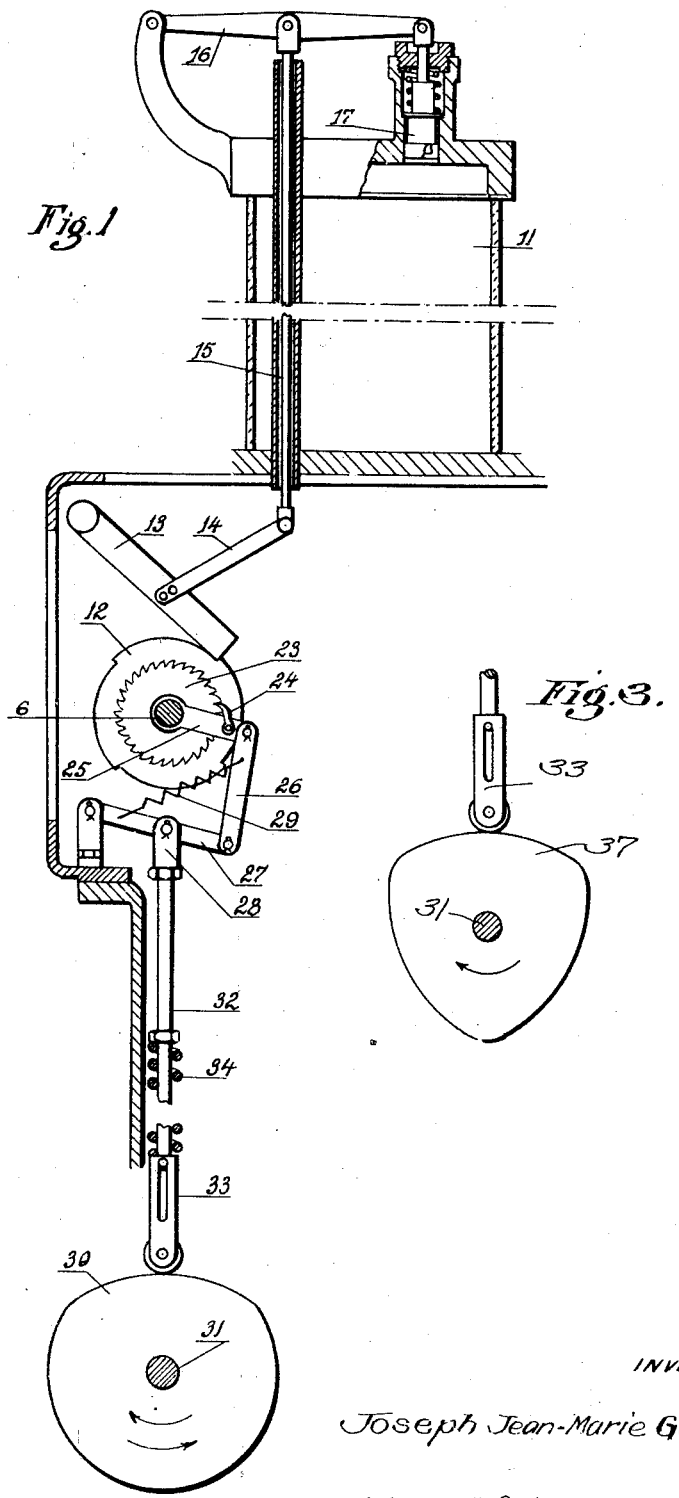

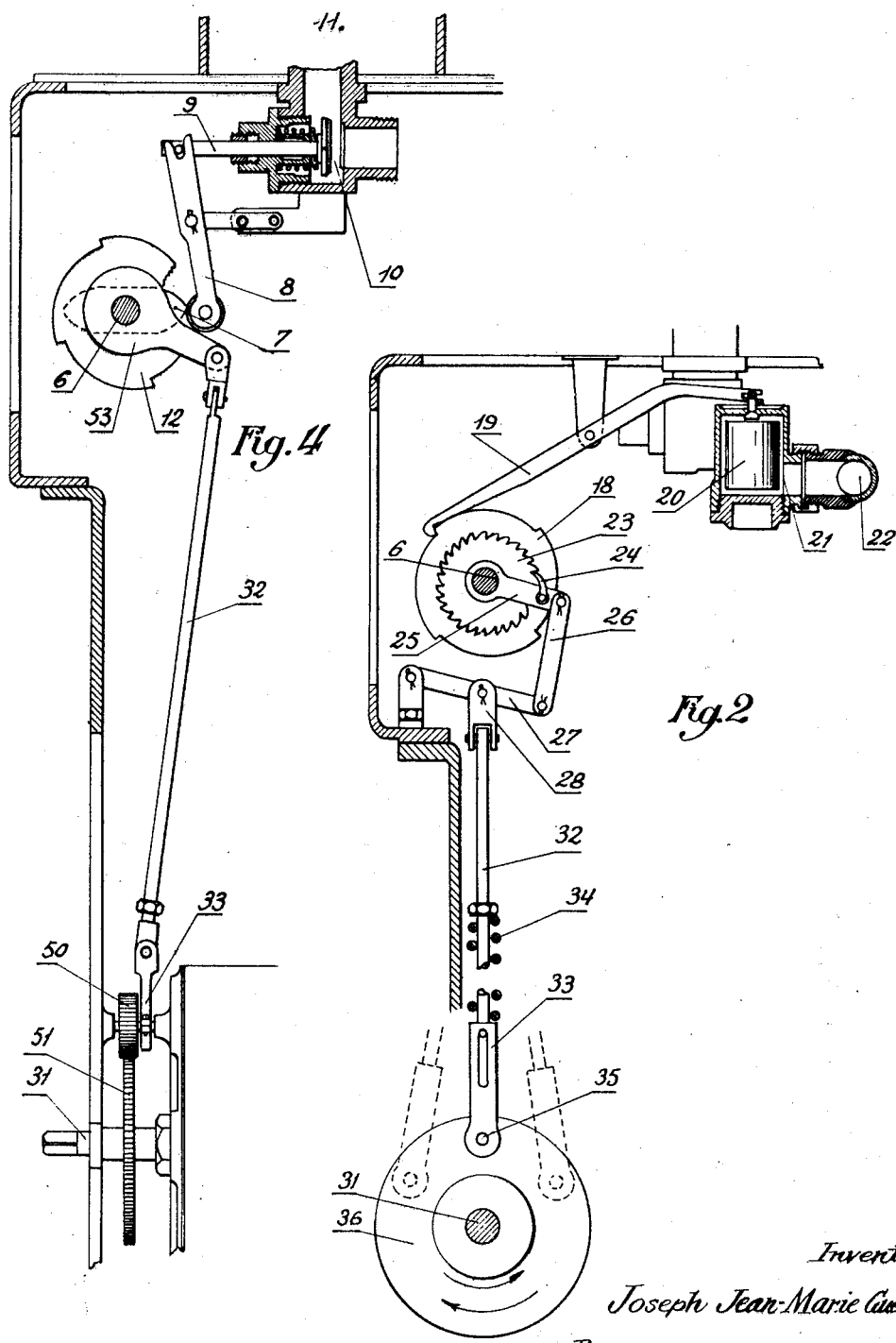

Inventor
Joseph Jean-Marie Gueux,
By William C. Linton.
Attorney.

Patented Dec. 15, 1931

1,837,041

UNITED STATES PATENT OFFICE

JOSEPH JEAN MARIE GUEUX, OF IVRY-SUR-SEINE, FRANCE

MECHANISM FOR THE AUTOMATIC CONTROL OF LIQUID DISTRIBUTORS

Application filed May 31, 1929, Serial No. 367,536, and in France June 4, 1928.

The present invention relates to distributors for liquids, which comprise two measuring vessels whereof one can be filled while the other is being emptied, thus obtaining a practically continuous distribution.

As a rule, each vessel is provided with a supply cock and a discharge or distributing cock, which are controlled by the cam shaft common to the two vessels.

The different operations of the cocks are thus assured by the rotation of the cam shaft, and safety devices are provided to hold the said shaft as long as the vessel which is being filled is not entirely full of liquid, and as long as the other vessel is not entirely empty.

When these two conditions have been complied with, the cam shaft can freely rotate so as to afford the proper functioning of the cocks.

According to the invention, this rotation of the cam shaft is automatically effected as soon as the safety devices have released the said shaft.

For this purpose, the cam shaft is connected to a movable part of the pump supplying the distributor by a set of mechanical parts, two of which are connected together by a spring, friction, or other device, by which these parts are held together as long as there exists a certain degree of resistance, but when this resistance is exceeded, the two parts may execute relative movements without effecting the proper operation of my improved device.

In a preferred form of construction, the cam shaft comprises a ratchet wheel whose pawl is mounted on a movable rod which is controlled by a cam, an eccentric, or a crank mounted on the shaft of the reciprocating or rotary pump supplying the distributor. The said rod consists of two telescoping pieces connected together by a strong spring. When the said pump is operated, the cam shaft is urged in rotation by means of the said rod, and ratchet wheel, and if the said shaft is held fast by the safety devices of the distributor, the two parts of said rod will be alone displaced, thus stretching the spring which joins them, but when the cam shaft is released, the spring contracts and the said shaft is rotated.

In a modification, the cam shaft is connected by gearing to the pump shaft with the interposition of two friction plates which are mutually slidable as long as the shaft is held fast; when the shaft is released, the plates will transmit the rotation of the pump to this shaft.

According to other modifications, the pump shaft may be provided with a gear wheel engaging a pinion secured to an eccentric whose strap is connected by a rod to a friction device mounted on the cam shaft, or by a spring-controlled rod to a rack cooperating with a gear wheel mounted on the cam shaft.

Various embodiments of the invention are shown by way of example in the accompanying drawings.

Fig. 1 shows one construction for use when the distributor is supplied by a reciprocating pump.

Fig. 2 is a modified form of the same.

Fig. 3 shows a construction for use when the pump shaft is rotary.

Fig. 4 is a further modification of parts embodied in my improved device, and

Figure 5:
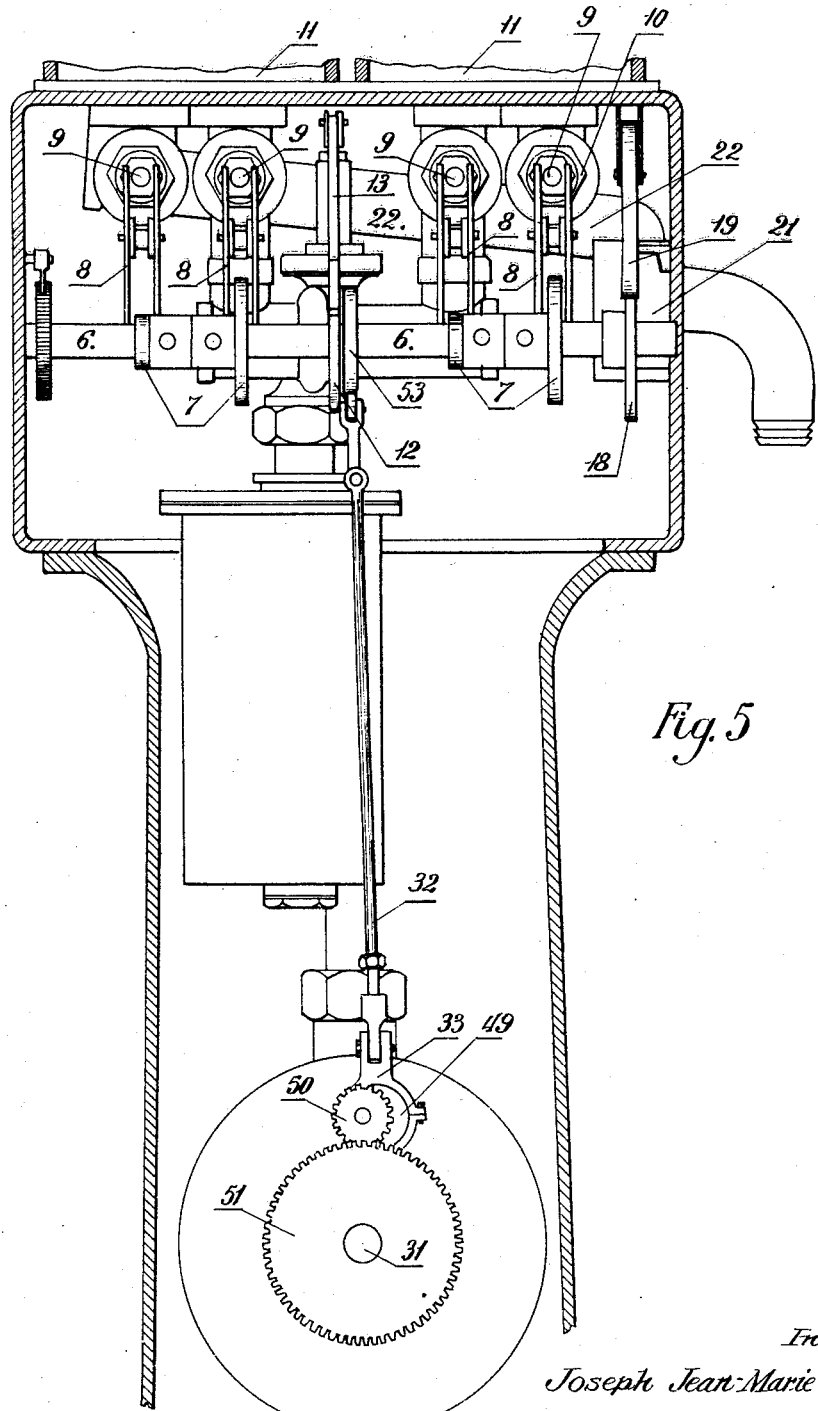
Fig. 5 is a front view of the same, showing the mechanism assembly of the invention.

In these figures, 6 is the cam shaft controlling a device for feeding the liquid to two measuring devices.

In Figures 1, 2 and 4, the said shaft is shown in section in different parts, so as to indicate the parts in connection therewith, but it is understood that the parts shown in the said figures are found in each feeding device or distributor for the liquid.

As more clearly shown in Fig. 5, the shaft 6 carries at least four cams 7 each cooperating with a lever 8 attached to the rod 9 of a cock 10 controlling the supply conduit or the feeding conduit of one of the measuring vessels (such as 11) of the distributor.

The shaft 6 as illustrated in Figs. 1 and 5 carries a disk 12 having shoulders cooperating with the end of a lever 13 which is connected by a link 14, a rod 15, and a rocking lever 16, to a manometric piston 17 mounted at the upper end of each measuring vessel 11.

The actuating shaft 6 as shown in Figures 1 and 5 carries a second disk 18 also provided with shoulders (Fig. 2) cooperating with a lever 19 connected on the other hand to a float 20 disposed in a chamber 21 in direct connection with the discharge conduit 22 of the apparatus.

By means of the cams 7, the shaft 6 when rotating will control the four cocks 10 of the distributor, and this rotation cannot be effected as long as the lever 13 is not disengaged from the disk 12, and the lever 19 is not released from the disk 18, that is, as long as the liquid has not filled the vessel 11, thus raising the piston, and as long as any liquid is in the discharge conduit 22 so as to raise the float 20, that is, as long as the vessel which is being emptied is not entirely empty.

When these two conditions are complied with, that is, when the piston 17 rises and the float 20 descends, the shaft 6 is enabled to rotate freely, thus directly operating the four cocks 10 of the distributor. According to the invention, the shaft 6 is automatically rotated.

In the construction shown in Figure 1, the shaft 6 carries a ratchet wheel 23 cooperating with a pawl 24 mounted on a pivoted arm 35 connected by a link 26 to a pivoted lever 27 controlled by a spring 29 and secured at 28 to a movable rod, cooperating with a cam 30 mounted on the axle 31 of the reciprocating pump of the distributor.

The movable rod consists of two members whereof one 32 is slidable in the other 33 and is urged apart from the same by a spring 34.

The operation of the said apparatus is as follows:

Supposing that the shaft 6 is held fast by the lever 13 (Figures 1 and 5) or by the lever 19 (Figs. 2 and 5), the movements of the shaft 31 of the pivoted pump cause the periodic ascent of the member 33, but since the member 32 is held by the shaft 6, at each movement of the member 33, the spring 34 will be compressed but without effect.

When the shaft 6 is released, the spring 34, which has been made strong, will impart the movements of the member 33 to the member 32, so that the pawl 24 turns the wheels 23 and with it the shaft 6, until the said shaft is again held by the said levers 13—19.

It is thus observed that in order to assure the continuous functioning of the distributor, it is simply necessary to operate the feed pump.

In Fig. 2, the same reference characters denote like parts, as shown in Fig. 1, except that the member 33 is pivoted at 35 to a disk mounted on the shaft 31 of the pump. The apparatus thus operates as in the preceding case.

The modification shown in Figure 3 is applicable in the case in which the pump is of the rotary type. Its axis 31 carries a cam 37 provided with three bosses cooperating with the member 33 (Fig. 1).

In the modification of the cock controlling means shown in Figures 4 and 5, the pump shaft 31 carries a gear wheel 51 engaging a pinion 50 mounted on an eccentric 49 whose strap consists of a member 33'. This arrangement operates equally well with a rotary pump or a reciprocating pump.

The rod 32 of any of the devices shown in Figures 1, 2 and 3 may be pivoted as indicated in Figures 4 and 5 to a friction disk 53 acting for instance upon the disk 12 mounted on the cam shaft 6. In this construction it will be noted that the spring 34 has been eliminated, and the members 32—33 have been connected together.

Obviously, the invention is not limited to the type of liquid distributor above specified by way of example, and that it is applicable to all distributors comprising a controlling shaft and also safety devices.

I claim:

1. A mechanism for the automatic control of liquid distributors, comprising a rotatable controlling shaft for the distributor, a supply pump, and means between said rotatable shaft and said pump for communicating to the shaft the movements of the pump, said means including two associated elements capable of relative displacement with respect to each other, upon one of said elements meeting with a resistance to the normal movement.

2. A mechanism for the automatic control of liquid distributors, comprising a rotatable controlling shaft for the distributor, a supply pump, and means between said rotatable shaft and said pump for communicating to the shaft the movements of the pump, said means including a disk rigid with the controlling shaft, a second disk freely carried upon the shaft and in frictional engagement with the first disk, a rod having one end secured to said second disk, an eccentric mounted upon the free end of the rod, and movement transmitting means associated with the pump and operatively connected to said eccentric.

In witness whereof I have hereunto set my hand.

JOSEPH JEAN MARIE GUEUX.